(12) United States Patent
Schweigkoffer et al.

(10) Patent No.: US 7,774,319 B2
(45) Date of Patent: Aug. 10, 2010

(54) SYSTEM AND METHOD FOR AN OPTIMISTIC DATABASE ACCESS

(75) Inventors: Rainer Schweigkoffer, Mannheim (DE); Guenther Drach, Bruchsal (DE); Tobias Wenner, Nussloch (DE); Frank-Martin Haas, Dielheim (DE); Torsten Ziegler, Dielheim (DE)

(73) Assignee: SAP AG, Walldorf (DE)

( * ) Notice: Subject to any disclaimer, the term of this patent is extended or adjusted under 35 U.S.C. 154(b) by 810 days.

(21) Appl. No.: 10/917,548

(22) Filed: Aug. 11, 2004

(65) Prior Publication Data

US 2006/0036574 A1    Feb. 16, 2006

(51) Int. Cl.
    *G06F 17/00*    (2006.01)
(52) U.S. Cl. ...................................... 707/690
(58) Field of Classification Search ............ 707/8, 707/201, 2; 709/203
    See application file for complete search history.

(56) References Cited

U.S. PATENT DOCUMENTS

| | | | | |
|---|---|---|---|---|
| 5,263,155 A | * | 11/1993 | Wang | 707/8 |
| 5,530,851 A | * | 6/1996 | Fortier | 707/2 |
| 5,561,794 A | * | 10/1996 | Fortier | 707/8 |
| 5,752,026 A | * | 5/1998 | Fortier | 707/103 R |
| 5,870,758 A | * | 2/1999 | Bamford et al. | 707/201 |
| 5,893,117 A | * | 4/1999 | Wang | 707/203 |
| 5,983,225 A | * | 11/1999 | Anfindsen | 707/8 |
| 6,233,585 B1 | * | 5/2001 | Gupta et al. | 707/103 R |
| 6,772,155 B1 | * | 8/2004 | Stegelmann | 707/8 |
| 2002/0004799 A1 | * | 1/2002 | Gorelik et al. | 707/201 |
| 2002/0138483 A1 | * | 9/2002 | Bretl et al. | 707/8 |
| 2003/0236786 A1 | * | 12/2003 | Shi et al. | 707/8 |
| 2004/0078379 A1 | * | 4/2004 | Hinshaw et al. | 707/100 |

* cited by examiner

*Primary Examiner*—Pierre M Vital
*Assistant Examiner*—Christopher J Raab
(74) *Attorney, Agent, or Firm*—Schwegman, Lundberg & Woessner, P.A.

(57) ABSTRACT

In an embodiment, a database interface performs a three-step optimistic database access. The database interface initially performs an optimistic read of a database object. The database object is checked for consistency after the optimistic read. If the database object is inconsistent, a first pessimistic read is performed with an isolation level that does not guarantee consistency (e.g., with an isolation level of committed read). The database object is checked again for consistency after the first pessimistic read. If the database object is inconsistent, a second pessimistic read is performed with an isolation level that may guarantee consistency (e.g., with an isolation level of repeatable read).

30 Claims, 8 Drawing Sheets

SYSTEM AND METHOD FOR AN OPTIMISTIC DATABASE ACCESS

TECHNICAL FIELD

Embodiments of the invention generally relate to the field of data processing and, more particularly, to a system and method for an optimistic database access.

BACKGROUND

Many businesses provide access to their products and services through applications that are delivered over computer networks such as the Internet. These applications typically have a multi-tiered architecture. In those cases where the applications are delivered over the Internet they are commonly referred to as Web-based applications. FIG. 1 is a block diagram of a Web-based application 100 having a multi-tiered architecture.

Web-based application 100 includes client layer 110, application layer 120, and database layer 130. Client layer 110 includes user interface 112 that runs on a client computing device such as a desktop computer, laptop computer, personal digital assistant, telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP), HTTP secured through the Secure Socket Layer, the Simple Object Access Protocol (SOAP), and the like. Presentation logic 142 generates a Graphical User Interface (GUI) using, for example, a markup language such as the HyperText Markup Language (HTML). Business logic 144 represents the core of the application, for example, the rules governing the underlying business process (or other functionality) provided by the application. The Java 2 Enterprise Edition Specification v1.3, published on Jul. 27, 2001 (the J2EE Standard) defines an increasingly popular architecture for application layer 120.

Database layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database.

Database interface 146 provides an interface between business logic 144 and database layer 130. Database interface 146, for example, establishes (and terminates) connections between business logic 144 and database layer 130. Business logic 144 accesses database tables (and, in some cases, a data dictionary) via database interface 146. Typically, database interface 146 controls the access of database tables using transactions. The term "transaction" refers to a series of database operations that form a unit with regard to backup and synchronization (e.g., a read transaction or a write transaction).

The operations of one transaction may generate data inconsistencies for the operations of another transaction. The three most common types of data inconsistencies are: dirty reads, non-repeatable reads, and phantom reads. The term "dirty read" refers to reading data before it is committed to a database and that is, subsequent to the read, rolled-back. The term "non-repeatable read" refers to data that is read twice during a transaction and modified subsequent to the first read but before the second read. The term "phantom read" refers to reading a set of database table rows twice during a transaction. If a new row is inserted after the first read and before the second read, then the new row appears to be a "phantom" because it did not exist during the first read.

Transaction isolation levels determine the extent to which the operation of one transaction affects the operation of another transaction. For example, the more isolated one transaction is from another, the more consistent the accessed data may be. Transaction isolation levels are typically implemented by placing locks on the rows in a database table. Placing locks on the rows of a database table, however, may limit the number of concurrent data accesses that are possible. If too many locks are placed on the table, then the performance of the database may be reduced. Alternatively, if too few locks are placed on the database, then the accessed data may be inconsistent.

SUMMARY OF THE INVENTION

In an embodiment, a database interface performs a three-step optimistic database access. The database interface initially performs an optimistic read of a database object. The database object is checked for consistency after the optimistic read. If the database object is inconsistent, a first pessimistic read is performed with an isolation level that does not guarantee consistency (e.g., with an isolation level of committed read). The database object is checked again for consistency after the first pessimistic read. If the database object is inconsistent, a second pessimistic read is performed with an isolation level that may guarantee consistency (e.g., with an isolation level of repeatable read).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In an embodiment, a database interface performs a three-step optimistic database access. The database interface initially performs an optimistic read of a database object. The database object is checked for consistency after the optimistic read. If the database object is inconsistent, a first pessimistic read is performed with an isolation level that does not guarantee consistency (e.g., with an isolation level of committed read). The database object is checked again for consistency after the first pessimistic read. If the database object is inconsistent, a second pessimistic read is performed with an isolation level that may guarantee consistency (e.g., with an isolation level of repeatable read).

Figure 1:
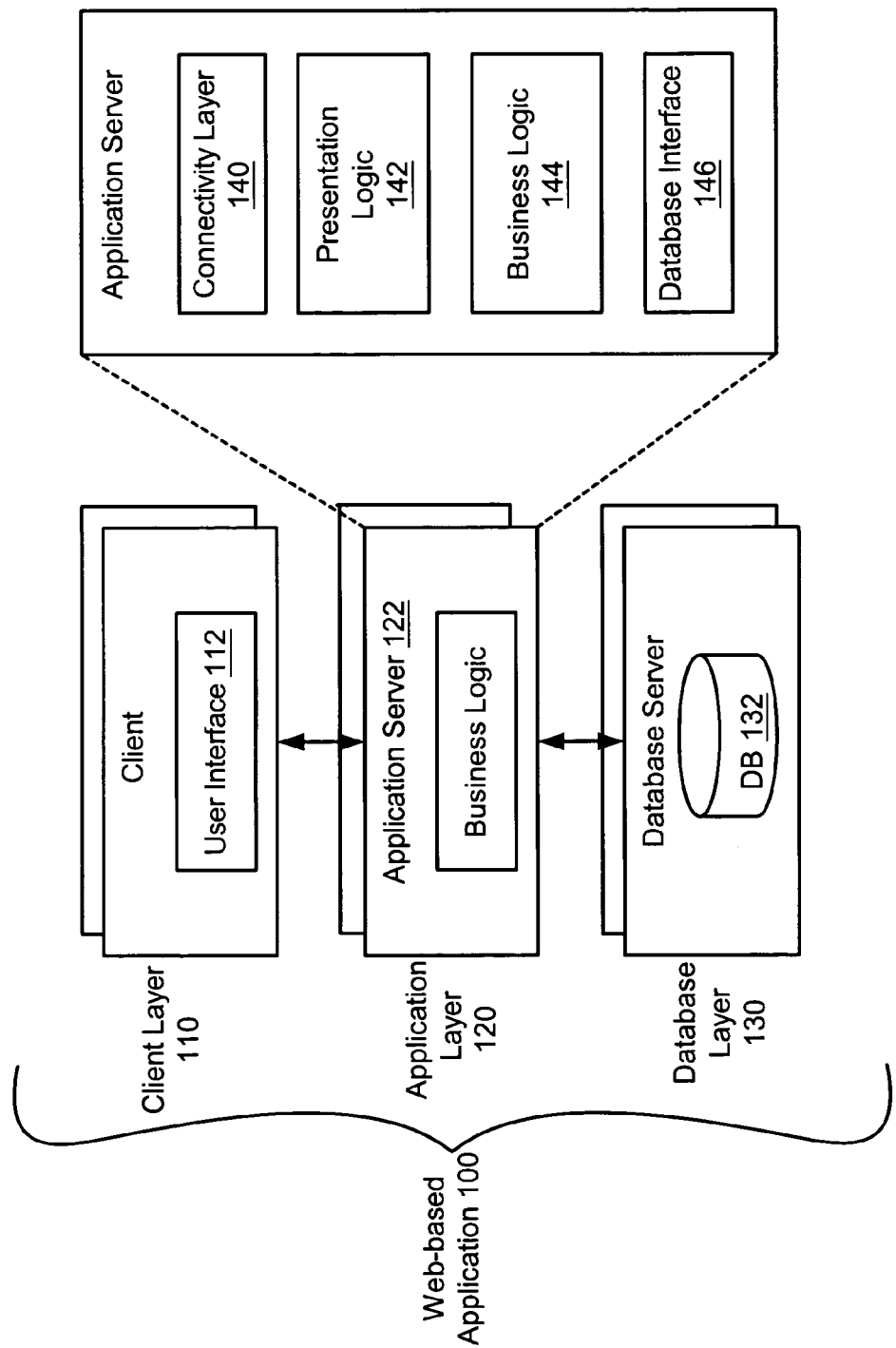
FIG. 1 is a block diagram of a Web-based application having a multi-tiered architecture.
Figure 2:
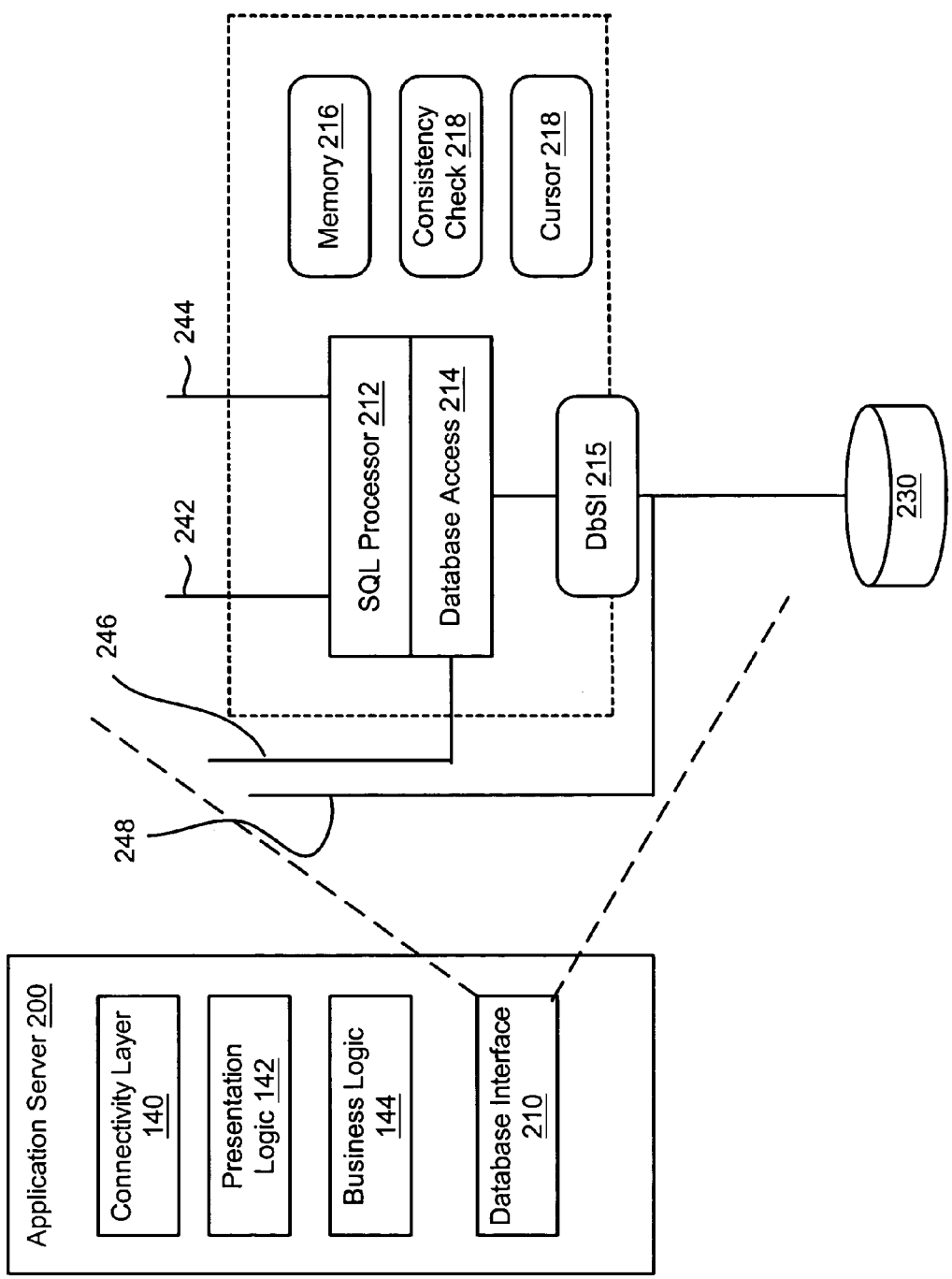
FIG. 2 is a block diagram of selected elements of an application server implemented according to an embodiment of the invention.

FIG. 2 is a block diagram of selected elements of application server 200 implemented according to an embodiment of the invention. In an embodiment, application server 200 may be part of a multi-tiered network. The multi-tiered network may be implemented using a variety of different application technologies at each of the layers of the multi-tier architecture, including those based on the Java 2 Enterprise Edition™ ("J2EE") specification (e.g., the Websphere platform developed by IBM Corporation), the Microsoft .NET platform, and/or the Advanced Business Application Programming ("ABAP") platform developed by SAP AG. The J2EE specification refers to any of the J2EE specifications including, for example, the Java 2 Enterprise Edition Specification v1.3, published on Jul. 27, 2001.

Application server 200 includes database interface 210. In an embodiment, database interface 210 controls transactions that perform read, write and modify operations on database 230. Database interface 210 may enforce a transaction isolation level for one or more (or each) transaction that it controls.

Transaction isolation levels determine the extent to which the operation of one transaction can affect the operation of another transaction. The American National Standards Institute (ANSI) defines four isolation levels in the ANSI X3.135-1992 standard entitled, "American National Standard for Information Systems—Database Language—SQL, November 1992" (SQL-92 standard). The four isolation levels defined by the SQL-92 standard are: uncommitted read, committed read, repeatable read, and serializable.

A transaction running in the uncommitted read mode may (but not necessarily must) see uncommitted data. The term uncommitted data refers to data that has been written by a transaction but has not yet been committed to the database. Typically, the uncommitted read isolation level only guarantees that two transactions are not allowed to write to the same database object at the same time. The term "database object" broadly refers to an accessible portion of a database (e.g., a row, set of rows, table, set of tables, etc.). The uncommitted read isolation level does not protect against dirty reads, phantom reads, or non-repeatable reads.

A transaction running in the committed read mode cannot read data that has not been committed to the database. Thus, the committed read isolation level prevents dirty reads from occurring. The committed read isolation level, however, does not prevent phantom reads or non-repeatable reads because it does not prevent another transaction from modifying (or adding) data to a database object that is being read.

A transaction running in the repeatable read mode only sees deletions and modifications that were committed at the time of the first access by the transaction. The repeatable read isolation level, however, does not prevent another transaction from inserting data (e.g., a new row) into a database object that is being read. Thus, the repeatable read isolation level prevents dirty reads and non-repeatable reads but does not prevent phantom data.

A transaction running in the serializable mode only sees deletions, modifications, and insertions that were committed at the time of first access by the transaction. The serializable mode typically specifies that both read and write operations cause an exclusive lock to be placed on the database object to prevent another transaction from accessing the object. Thus, the serializable mode prevents dirty reads, non-repeatable reads, and phantom data. The term "exclusive lock" refers to a lock that is exclusively held by a single transaction. The term "shared lock" refers to a lock that allows the operations of more than one transaction to access a database object. Shared locks are often used during, for example, read operations to allow more than one transaction to read a database object at the same time.

Some database vendors provide alternative (or additional) isolation levels to the isolation levels defined by the SQL-92 standard. For example, Oracle Corporation specifies a consistent read isolation level. A transaction running in the consistent read isolation level only sees data that was committed at the beginning of a query and this guarantee applies to deletions, insertions, and modifications of the data.

In some cases, reasonable database performance is only available if the isolation level is set to uncommitted read. The "optimistic read" was introduced to help ensure data consistency when the isolation level is set to uncommitted read. An optimistic read refers to performing a read without enforcing consistency requirements (e.g., in accordance with the uncommitted read isolation level). After the data is read a database interface (e.g., database interface 210, shown in FIG. 2) performs consistency checks (e.g., using consistency check logic 218). Consistency checks are further discussed below with reference to FIG. 4.

Transaction isolation levels may be implemented by placing locks on read or changed rows in a database table. The number (and extent) of concurrent data accesses that are possible are limited by the locks that are placed on the rows of a database table. Experience has shown that if the isolation level is stronger, then throughput and scalability decrease. In order to achieve better performance, database platforms typically strike a balance between data consistency and the number of possible concurrent accesses.

In an embodiment, database interface 210 provides a uniform infrastructure for accessing relational database 230. Database interface 210 may receive static and/or dynamic Structured Query Language (SQL) statements at 242. Similarly, database interface 210 may receive object oriented persistence requests (e.g., Enterprise Java Bean and/or Java Data Object persistence requests) at 244. In one embodiment, database interface 210 also supports vendor specific database accesses at reference number 248.

In one embodiment, SQL processor 212 provides one or more methods to check an SQL statement (and/or an object-oriented persistence request) against an "SQL grammar." The term "SQL grammar" refers to one or more syntactical and/or semantical rules that define a permissible SQL statement. SQL processor 212 may also provide a table buffer. The purpose of a table buffer is to enhance database queries by keeping frequently requested rows of a database table in a client-side buffer.

Database access layer 214 may provide database access for SQL statements 242, object-oriented persistence requests 244, and/or native SQL statements 246. Native SQL statements refers to SQL statements that need not meet the requirements of the SQL grammar enforced by SQL processor 212. In one embodiment, database access layer 214 also provides functions such as an SQL trace and/or statement pooling. An SQL trace refers to a log of SQL statements that are issued against a database. A statement pool refers to a cache of prepared statements that may be used repeatedly.

In an embodiment, database shared library (DbSl) 215 specifies a number of database settings such as whether to use an optimistic or pessimistic read (or write) and/or which isolation level to use during a pessimistic read (or write). The term "shared library" refers to a collection of software entities (e.g., modules, files, etc.) that are used by more than one application. A "database shared library" refers to a shared library that facilitates interaction between applications (e.g., business logic 144) and a database (e.g., database 230). The settings may be retrieved with, for example, a DbSl control command (e.g., DBSL_CMD_CLUOPTLEVDEF_GET). In one embodiment, a DbSl flag signals a database port when the second pessimistic read is executed. Similarly, a DbSl flag (or other setting) may specify which isolation level to apply during the second pessimistic read. For example, a first read is issued with a default isolation level (e.g., optimistic read). If a consistency check finds an inconsistency, a second read with a higher isolation level is issued for the database object (e.g., via DbSl flag DBSL_FLAG_ONE_LOGICAL_ITEM). In an embodiment, the higher isolation level is committed read. If a second consistency check finds an inconsistency, a third read with a higher isolation is issued (e.g., via DbSl flag DBSL_FLAG_ONE_LOGICAL_ITEM). In one embodiment, a flag and/or setting (e.g., DBSL_FLAG_FORCE_OBJECT_CONSISTENCY) specifies an isolation level for the third read (e.g., repeatable read isolation level).

In an embodiment, the settings specified in DbSl 215 may be overwritten by a profile parameter (e.g., rsdb/rclu/opt_level). The term "profile parameter" refers to a parameter that specifies an attribute of, for example, database interface 210. In one embodiment, the profile parameters are dynamic. A "dynamic" profile parameter refers to, for example, a profile parameter that may be changed without restarting an application server or the work processes executing on the application server.

Database cursor 218 is a pointer (e.g., a position indicator) that points to data on database 230 (or a cached version of the data in, e.g., memory 216). Typically cursor 218 points to a result set of a database query operation. In some cases, cursor 218 can become corrupted during an optimistic read of data on database 230. A corrupted cursor may be indicated in DbSl 215 with a return code (e.g., DBSL_RC_SQL_ERROR) that specifies an error (e.g., of error class DBSL_EC_RETRYOP). In an embodiment, database interface 210 opens a new cursor 218 for the database access statement (e.g., SQL statement) to continue processing the statement. In one embodiment, the new cursor skips all records that have already been fetched and fetches those records that have not yet been fetched.

Turning now to FIGS. 3-7, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 3:
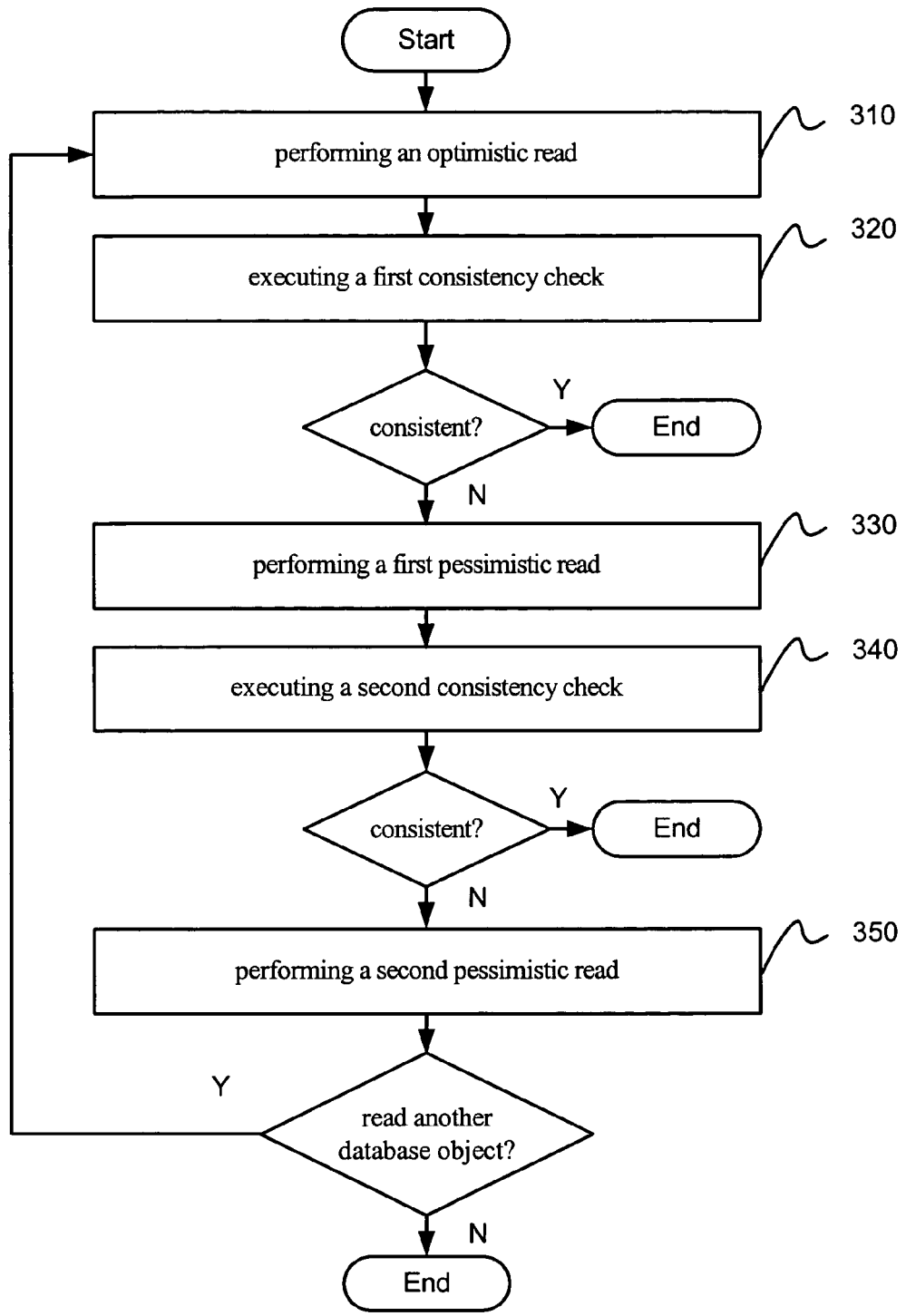
FIG. 3 is a flow diagram illustrating certain aspects of a method for reading a database object, according to an embodiment of the invention.

FIG. 3 is a flow diagram illustrating certain aspects of a method for reading a database object, according to an embodiment of the invention. In one embodiment, a read operation includes three phases. Each of the three phases may require an increasing degree of data consistency (e.g., a stronger transaction isolation level). In one embodiment, the read data (e.g., the read database object) is checked for consistency after each phase. If the data is not consistent, then the next phase is applied. Otherwise, the read operation is successful at the present phase.

Referring to process block 310, an optimistic read of a database object is performed during a transaction. The term "optimistic read" refers to performing a read without enforcing consistency requirements (e.g., in accordance with the uncommitted read isolation level). The phrase "during a transaction" refers to performing the optimistic read in response to a database access operation that is structured as part of a transaction.

Referring to process block 320, a first consistency check of the read data (e.g., the read database object) is executed. The term "consistency check" refers to checking the integrity of the read data. In general terms, a consistency check involves accessing a database object (or part of a database object) that has been previously read to determine whether it has been changed in the interim. Consistency checks may be implemented using a number of techniques including those based on timestamps, version counts, and state comparisons.

Figure 4:
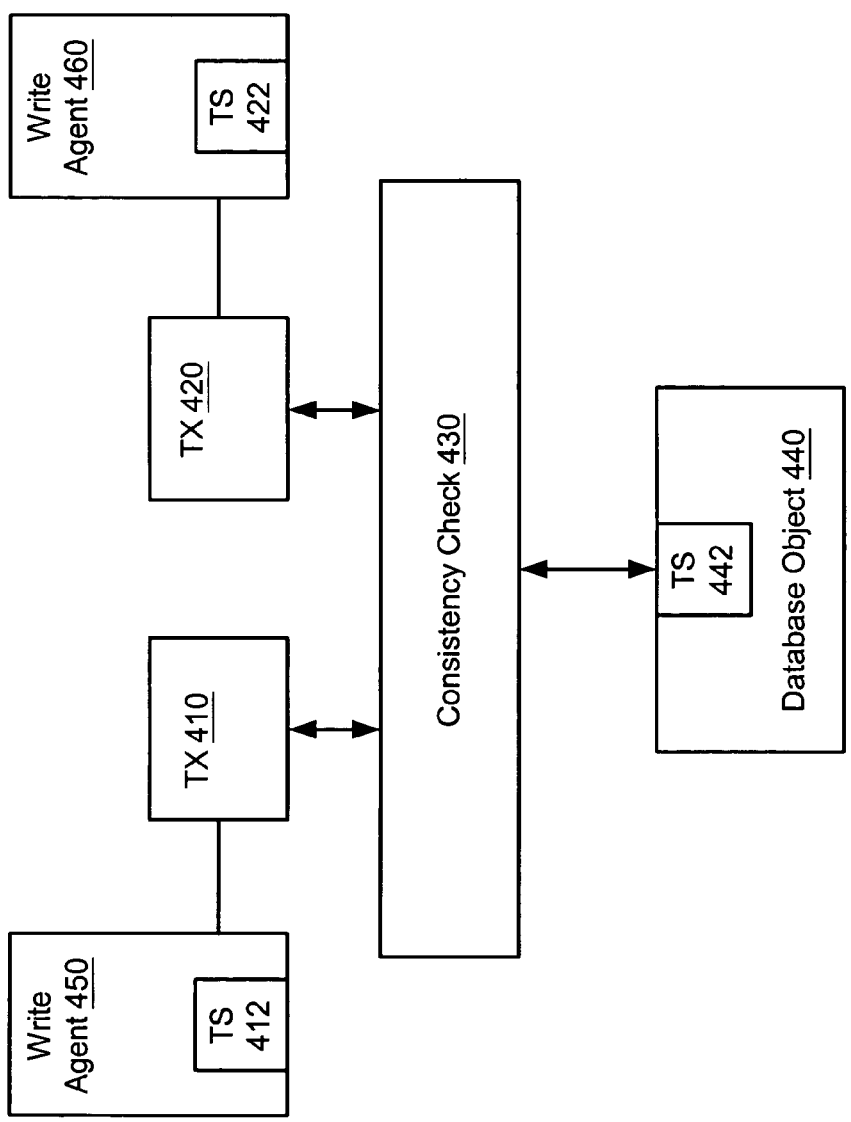
FIG. 4 is a conceptual illustration of a consistency check implemented according to an embodiment of the invention.

FIG. 4 is a conceptual illustration of a consistency check implemented according to an embodiment of the invention. The illustrated embodiment includes transactions 410 and 420, write agents 450 and 460, consistency check logic 430, and database object 440. Transactions 410 and 420 represent units of work that either complete satisfactorily (e.g., with a commit operation) or are completely abandoned (e.g., with a roll-back operation). Write agents 450 and 460 respectively represent logic directing the write operations of transactions 410 and 420. Consistency check logic 430 determines whether accessed data is consistent (e.g., has not been modified by another transaction). Database object 440 represents one or more rows of one or more database tables.

Write agents 450 and 460 represent transactions that are concurrently operating. In one embodiment, each write agent is assigned a timestamp to uniquely identify the write agent. For example, write agent 450 includes timestamp 412 and write agent 460 includes timestamp 422. In addition, database object 440 includes timestamp 442. In one embodiment, timestamp 442 is determined, at least in part, by the write agent that has most recently accessed database object 440. In such an embodiment, timestamp 442 may be set so that it is equal to the timestamp of the write agent that most recently accessed database object 440 (e.g., one of timestamps 412 and 422).

In operation, a write agent, for example write agent 450, accesses database object 440. In an embodiment, timestamp 442 is set to the value of timestamp 412 to identify the write agent that has most recently accessed it. When transaction 410 attempts to complete, consistency check logic 430 accesses timestamp 442. Consistency check logic 430 compares timestamp 442 to timestamp 412. In one embodiment, if timestamp 412 matches (e.g., is equal to) timestamp 442, then database object 440 is consistent and transaction 410 completes successfully (e.g., with a commit operation). Alternatively, if timestamp 412 does not match timestamp 442, then database object 440 is not consistent and transaction 410 is abandoned (at least temporarily).

Referring again to FIG. 3, a first pessimistic read is performed on the database object, if the first consistency check indicates that the database object is not consistent. The term "pessimistic read" refers to placing a lock on the accessed data to prevent other transactions from accessing the data. In one embodiment, the first pessimistic read has an isolation level equal to or greater than the uncommitted read isolation level and less than a repeatable read isolation level. The phrase "greater than" in this context refers to a greater degree of isolation between transactions. Similarly, the phrase "less than" refers to a lesser degree of isolation between transactions. Thus, in an embodiment, the first pessimistic read has an isolation level that provides a greater degree of isolation between transactions than is provided by the uncommitted read isolation level. In an embodiment, the isolation level of the first pessimistic read is the committed read isolation level. The first pessimistic read provides more isolation between transactions than the optimistic read without the loss of concurrency that is associated with, for example, the repeatable read isolation level.

Referring to process block 340, a second consistency check of the accessed data is executed after performing the first pessimistic read. In one embodiment, the second consistency check is substantially similar to the first consistency check. In an alternative embodiment, the second consistency check is implemented differently than the first consistency check. For example, the first consistency check may be based on timestamps (e.g., as described above with reference to FIG. 4) and the second consistency check may be based on version counts or state comparisons.

If the database object is consistent, then the read operation completes successfully. If, however, the second consistency check indicates that the database object is not consistent, a second pessimistic read is performed at process block 350. In an embodiment, the second pessimistic read provides more isolation between transactions than the first pessimistic read.

In one embodiment, the second pessimistic read has an isolation level greater than or equal to the consistent object isolation level. The consistent object isolation level refers to an isolation level that provides a consistent view of the database object. In an embodiment, the consistent object isolation specifies that the rows forming the database object are accessed in the same order during read operations and write operations. During write operations, the first row of the database object is locked first. A transaction running in the consistent object isolation level sees modifications and deletions that were committed at the time of the first access on the object by the transaction. Thus, the transaction does not "see" uncommitted data. In one embodiment, the isolation level of the second pessimistic read is repeatable read. Alternatively, the isolation level of the second pessimistic read is, for example, consistent read or serializable.

In one embodiment, a DbSl flag signals a database port when the second pessimistic read is executed. Similarly, a DbSl flag (or other setting) may specify which isolation level to apply during the second pessimistic read. In an embodiment, a profile parameter may overwrite the DbSl setting (or otherwise specify), for example, the isolation level to apply during the second pessimistic read.

In an embodiment, the database interface performs another consistency check after the second pessimistic read. The consistency check may be based on, for example, timestamps, version counts, and/or state comparisons. In on embodiment, the consistency check is substantially similar to the consistency check described above with reference to FIG. 4.

The term "pessimistic write" may be used to refer to a conventional database access strategy used when modifying a database object. A pessimistic write typically involves accessing the database object with a SELECT FOR UPDATE statement. The SELECT FOR UPDATE statement places exclusive locks on the database object. Typically, modifications to the database object are first applied to a cached version of the database object residing in memory (e.g., memory 216, shown in FIG. 2). The database itself is updated when the parent transaction for the SELECT FOR UPDATE statement successfully completes (e.g., with a COMMIT operation). Alternatively, the database may be updated when the cached version of the database object is displaced from memory in accordance with a cache policy. The exclusive locks may be held on the database for a significant period of time because they are not released until the database itself is updated. Experience has shown that a pessimistic write creates a performance problem on some database platforms.

Figure 5:
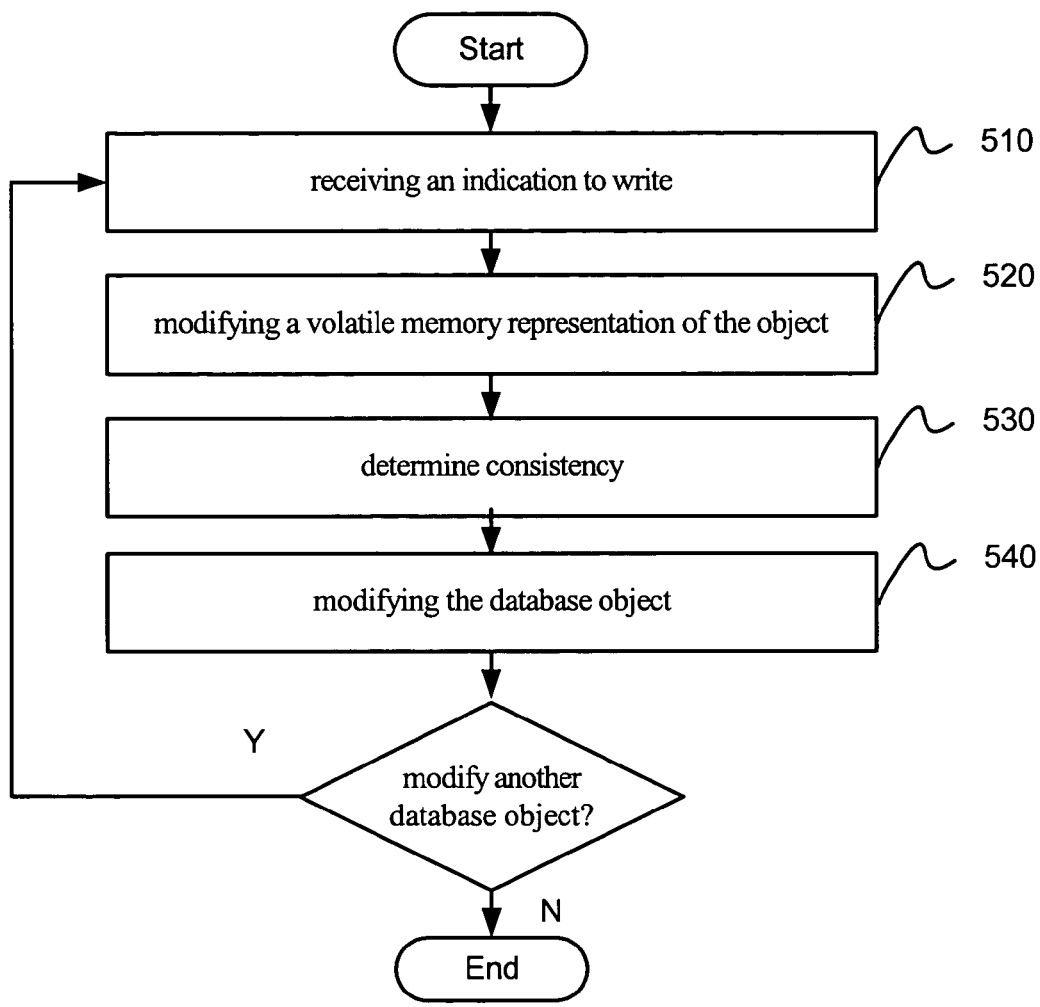
FIG. 5 is a flow diagram illustrating certain aspects of a method for an optimistic write operation, according to an embodiment of the invention.

In an embodiment, data is accessed with a strategy called optimistic write. The term "optimistic write" refers to, for example, reading data without placing exclusive locks on the database (or, without placing any locks on the database). FIG. 5 is a flow diagram illustrating certain aspects of a method for an optimistic write operation, according to an embodiment of the invention.

Referring to process block 510, a database interface (e.g., database interface 210, shown in FIG. 2) receives an indication that a database object is to be modified during a transaction. The term "receiving an indication" may refer to receiving a database access statement (e.g., an SQL statement). In an embodiment, a simple SELECT statement is used to access the database object for modifications. In alternative embodiments, other statements that do place a lock (or do not place an exclusive lock) on the database are used to access the database object.

Figure 6:
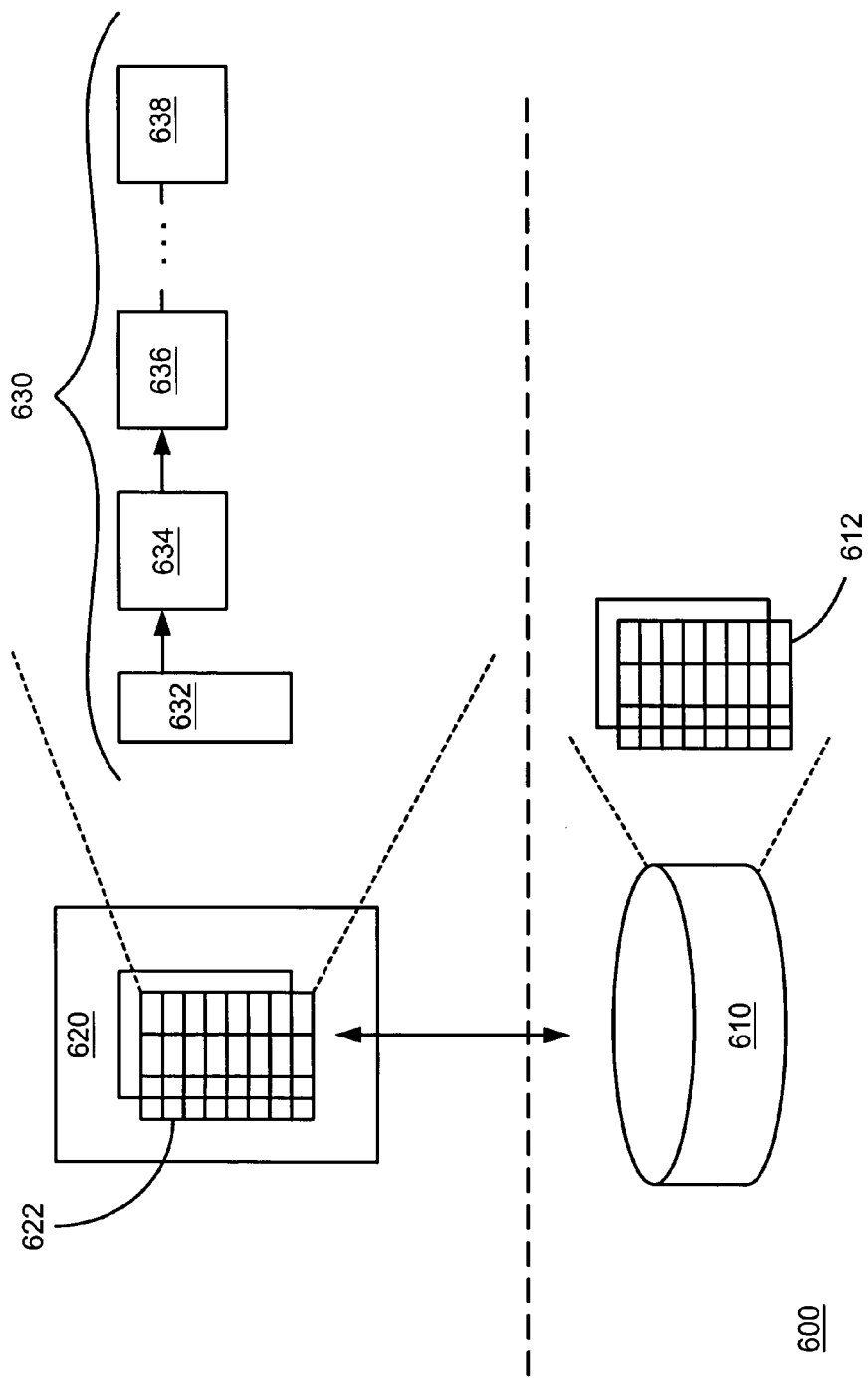
FIG. 6 illustrates selected aspects of a distributed system in which the data from a database is cached in volatile memory, according to an embodiment of the invention.

Referring to process block 520, a representation of the database object in volatile memory is modified. The term "modifying" refers to changing, adding, and/or deleting data in the database object (or the representation of the database object). The term "representation of the database object" refers to a cached version of the database object that resides in, for example, volatile memory. FIG. 6 illustrates selected aspects of distributed system 600 in which data from a database is cached in volatile memory, according to an embodiment of the invention. Distributed system 600 includes database 610 and volatile memory 620. Volatile memory 620 may be, for example, random access memory (e.g., system main memory), magnetic random access memory (MRAM), cache memory, and the like.

Database object 612 illustrates one or more rows of one or more tables stored on database 610. Database object 622 is an in-memory representation, at least in part, of database object 612. In an embodiment, an object in memory 620 (e.g., database object 622) can be mapped 1:1 to a corresponding object in database 610 (e.g., database object 612). The term "transparent" refers to an object (e.g., a table) in memory 620 that can be mapped 1:1 to an object in database 610. In one embodiment, the data stored in memory 620 may be organized into logical structures that do not directly map (or directly map only in part) to a structure on database 610. From the perspective of an application, however, these logical structures may behave as if they map 1:1 to a structure on the database. The term "intransparent" refers to a logical structure in memory 620 that behaves as if it maps 1:1 to a structure in database 610. Examples of intransparent objects include, for example, table pools, table clusters, and the like. A "table pool" is an intransparent structure containing a group of pooled tables that, when created, were assigned to the table pool (e.g., in a data dictionary). A "table cluster" (or simply, cluster) refers to an intransparent structure in which several logical rows from one or more cluster tables are combined to form a single physical record. The term "cluster table" refers to logical tables that are defined (e.g., in a data dictionary) to be part of the cluster.

Figure 7:
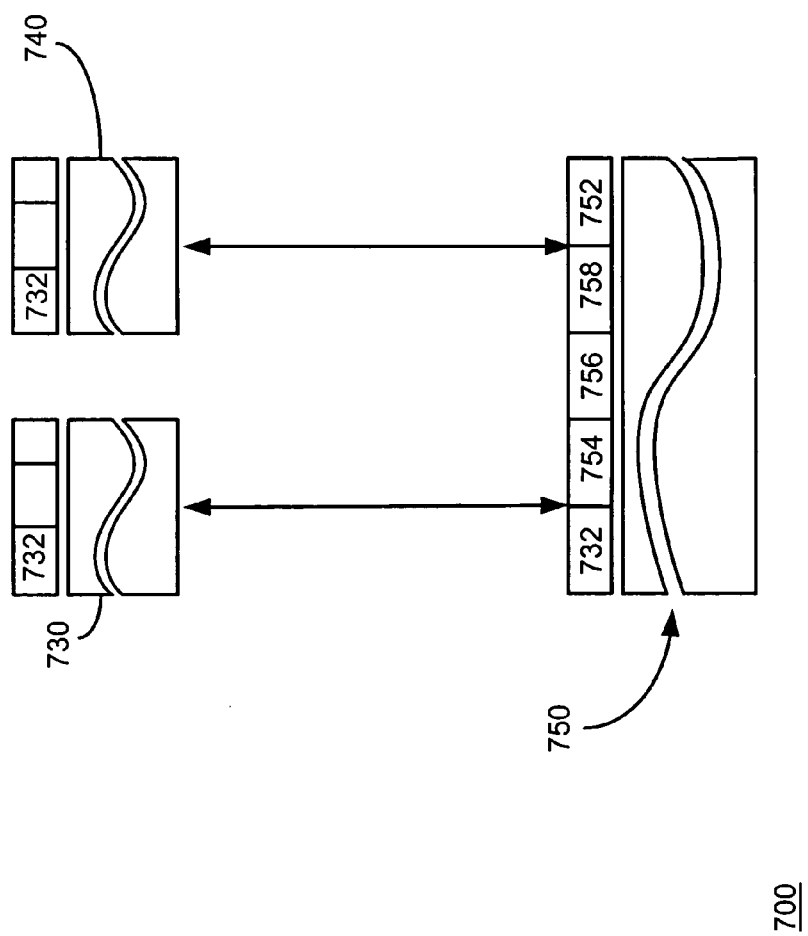
FIG. 7 is a block diagram illustrating one example of a table cluster.

FIG. 7 is a block diagram illustrating one example of cluster 700. Cluster 700 includes logical cluster tables 730 and 740 as well as physical cluster table 750. Logical cluster tables 730 and 740 map to physical cluster table 750. Cluster key 732 identifies the logical cluster tables that belong to physical cluster table 750. Cluster key 732 is, for example, the first n key fields of each logical cluster table mapped to physical cluster table 750.

In one embodiment, the records of logical cluster tables 730 and 740 are mapped to VARDATA field 752 of physical cluster table 750. VARDATA field 752 has a finite size (e.g., 3800 bytes). PAGENO field 754 consecutively numbers "continuation rows" to provide additional space as needed when the data mapped to VARDATA field 752 exceeds the allotted size. PAGELG field 758 denotes the number of bytes in VARDATA field 752 that are actually used for storing compressed data. TIMESTAMP field 756 provides a timestamp for physical cluster table 750.

In an embodiment, logical cluster tables 730 and 740 are defined in a data dictionary (not shown) but are not physically present on the database (e.g., database 610, shown in FIG. 6). Physical cluster table 750 is both defined in the data dictionary and represented on the database in a compressed form as a single transparent table (e.g., database object 612). Thus, physical cluster table 750 is a compressed representation of the materialized natural join of logical cluster tables 730 and 740.

Referring again to FIG. 6, in an embodiment, physical cluster table 750 is represented in memory 620 by the data stored in cache structure 630. The illustrated embodiment of cache structure 630 includes anchor 632 and data caches 634-638. Anchor 632 contains, for example, administrative information used to manage cache structure 630 such as the name of physical cluster table 750, directory information, flag(s), offset(s), state information, and the like. In an alternative embodiment, cache structure 630 may have more elements, fewer elements, and/or different elements. Data caches 634-638 contain the cached data (e.g., one or more rows of one or more tables) and administrative data such as a data cache identifier.

A database interface (e.g., database interface 210, shown in FIG. 2) controls data synchronization between memory 620 and database 610. In an embodiment, the database interface may maintain state information about cache structure 630 to support data synchronization. In one embodiment the state for cache structure 630 is associated with anchor 632. For example, anchor 632 may be assigned a state even if it currently does not house valid data for a physical cluster table. Table 1 illustrates an example of possible states that are defined in an embodiment of the invention.

TABLE 1

| State | Description |
|---|---|
| INVALID | No valid database object is contained in the cache. |
| UNDECIDED | It is unknown whether the cached data is consistent with the data on the database. |
| NEUTRAL | Data had been read in the current database transaction; no lock is held on the database; and cached data has not been modified. |
| O_LOCKED | Cached data is about to be modified and a lock has not been placed on the database. |
| O_MODIFIED | Cached data has been modified and a lock has not been placed on the database. |
| LOCKED | Cached data is about to be modified and a lock has been placed on the database. |
| MODIFIED | Cached data has been modified and a lock has been placed on the database. |

TABLE 1-continued

In one embodiment, the state transitions for an optimistic write differ from the state transitions for a pessimistic write. For example, in an optimistic write the state O_LOCKED is used instead of LOCKED for a modifying access. Similarly, when cached data has been modified during an optimistic lock, the state O_MODIFIED is used instead of MODIFIED. The states O_LOCKED and O_MODIFIED indicate that cached data is logically locked but there are no physical locks on the database.

Referring again to FIG. 5, the database interface (e.g., database interface 210, shown in FIG. 2) checks the consistency of the database object at reference number 530. In an embodiment, the consistency check may be performed, for example, prior to committing modifications made in memory 620 to database 610 at the completion of a transaction and/or when data in memory 620 is being displaced. In one embodiment, the consistency check determines whether the database object was modified by another transaction subsequent to the modification of the in-memory representation of the database object. As discussed above, consistency checks may be based on, for example, timestamps, version counts, and/or state comparisons. In one embodiment, the consistency check is substantially similar to the consistency check described above with reference to FIG. 4.

Referring to process block 540, the database object (e.g., database object 612) is modified if the consistency check determines that the object is consistent (e.g., has not been modified by another transaction). Otherwise, in an embodiment, the write operation is rolled back or discarded. The term "modifying the database object" refers to, for example, committing the changes made in memory (e.g., in memory 620, shown in FIG. 6) to the underlying database.

In an embodiment, a setting in an appropriate DbSl (e.g., DbSl 215, shown in FIG. 2) determines whether a database port uses an optimistic write or a pessimistic write. This setting can be retrieved from the DbSl via a DbSl control command (e.g., DBSL_CMD_CLUOPTLEVDEF_GET). In an embodiment, this setting can be overwritten by a profile parameter (e.g., rsdb/rclu/opt_level). In one embodiment, the profile parameter is dynamic (e.g., can be changed without restarting the application server).

Figure 8:
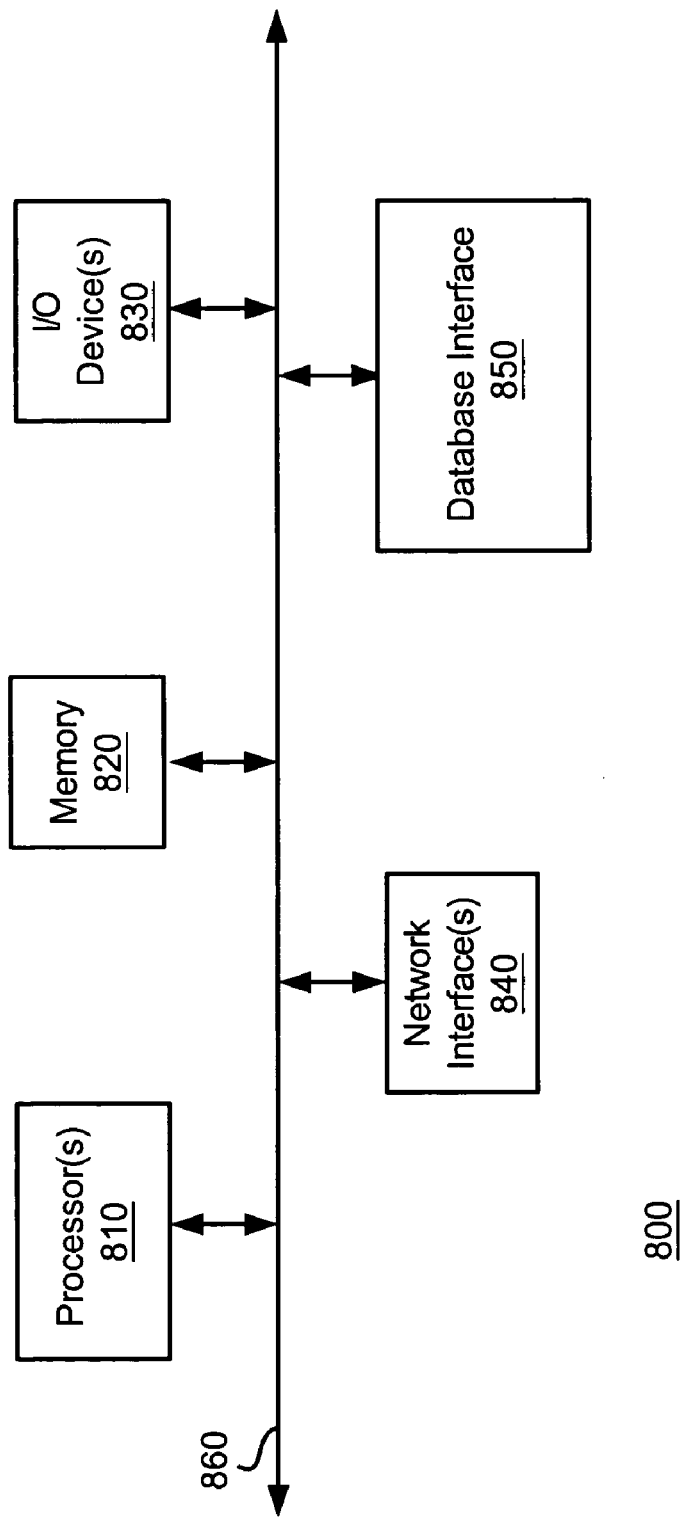
FIG. 8 is a block diagram of a node implemented according to an embodiment of the invention.

FIG. 8 is a block diagram of node 800 implemented according to an embodiment of the invention. Node 800 may include: processor(s) 810, memory 820, one or more Input/Output devices 830, network interface(s) 840, and database interface 850. The illustrated elements may be connected together through system interconnection 860. Processor(s) 810 may include a microprocessor, microcontroller, field programmable gate array (FPGA), application specific integrated circuit (ASIC), central processing unit (CPU), programmable logic device (PLD), and similar devices that access instructions from system storage (e.g., memory 820), decode them, and execute those instructions by performing arithmetic and logical operations.

Database interface 850 may enable node 800 to read data from and write data to a persistent store. Database interface 850 may be executable content, control logic (e.g., ASIC, PLD, FPGA, etc.), firmware, or some combination thereof, in an embodiment of the invention. In embodiments of the invention in which database interface 850 is executable content, it may be stored in memory 820 and executed by processor(s) 810.

Memory 820 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 820 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 820 may store program modules such as routines, programs, objects, images, data structures, program data, and other program modules that perform particular tasks or implement particular abstract data types that facilitate system use.

One or more I/O devices 830 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 860 permits communication between the various elements of node 800. System interconnection 860 may include a wide variety of signal lines including one or more of a memory bus, peripheral bus, local bus, host bus, bridge, optical, electrical, acoustical, and other propagated signal lines.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method for reading data from a database object in a database, wherein the method comprises:
   performing an uncommitted read including an optimistic read of the database object during a transaction, wherein the optimistic read is performed without enforcing consistency requirements of data that is not required to be committed to the database;
   executing a first consistency check of the database object to determine whether the data is consistent with the database;
   performing a committed read including a first pessimistic read of the database object during the transaction when the first consistency check indicates the data as being inconsistent with the database, wherein the performing of the committed read includes committing the data to the database and allowing concurrent modification of the database object;
   executing a second consistency check of the database object to determine whether the data is consistent with the database, in response to the first pessimistic read; and
   performing a guaranteed read including a second pessimistic read of the database object during the transaction when the second consistency check indicates the data not being consistent with the database, wherein the performing of the guaranteed read includes committing the data to the database and disallowing concurrent modification of the database object.

2. The method of claim 1, wherein:
   performing the uncommitted read that results in the data being inconsistent with the database comprises reading data that is not committed to the database when the database object is read, and is later abandoned; and wherein
   performing the committed read that results in the data being inconsistent with the database comprises reading data that is committed to the database when the database object is read, and subsequently or concurrently modified.

3. The method of claim 1, wherein performing the uncommitted read that results in the data being inconsistent with the database comprises the database identifying the uncommitted read as one of a dirty read, a non-repeatable read, or a phantom read of the database object.

4. The method of claim 1, wherein performing the committed read that results in the data being inconsistent with the database comprises performing a consistency check of the data that indicates the data is inconsistent with the database.

5. The method of claim 1, wherein performing the uncommitted read that results in the data being inconsistent with the database comprises performing a consistency check of the data that indicates the data is inconsistent with the database.

6. The method of claim 5, wherein performing the consistency check of the data that indicates that the data is inconsistent with the database comprises comparing an access timestamp of the database object with a write agent timestamp for the database object.

7. The method of claim 1, wherein performing the uncommitted read that results in the data being inconsistent with the database comprises receiving, from the database, an error indicating the data is not consistent with the database.

8. The method of claim 1, wherein performing the uncommitted read that results in the data being inconsistent with the database comprises determining that a cursor used to read the data in the database object is corrupted.

9. The method of claim 1, wherein performing the guaranteed read that disallows concurrent modification of the database object further comprises performing a consistency check on data read from the database object.

10. The method of claim 1, wherein performing the guaranteed read that disallows concurrent modification of the database object comprises exclusively locking the database object, excluding any other concurrent operation on the database object.

11. The method of claim 1, wherein performing the guaranteed read that disallows concurrent modification of the database object comprises creating a shared lock on the database object, excluding any other concurrent operation from modifying, updating, deleting, or writing to the database object.

12. The method of claim 11, wherein creating the shared lock comprises allowing concurrent read operations of the database object.

13. The method of claim 1, wherein:
performing the guaranteed read of the database object comprises performing a repeatable read or performing a serialized read of the database object.

14. The method of claim 1, wherein:
performing the committed read of the database object comprises performing a database read at an isolation level greater than an uncommitted read isolation level; and wherein
performing the guaranteed read of the database object comprises performing the database read at an isolation level greater than or equal to a consistent object isolation level.

15. The method of claim 14, wherein performing the guaranteed read that requires the data be committed to the database and disallows concurrent modification of the database object comprises setting a flag in a shared library of the database specifying a database read isolation level greater than or equal to a repeatable read isolation level.

16. The method of claim 1, wherein:
performing the committed read of the database comprises performing the committed read of the database object responsive to performing the uncommitted read that results in the data being inconsistent with the data base object; and wherein
performing the guaranteed read of the database object comprises performing the guaranteed read of the database object responsive to performing the committed read that results in the data being inconsistent with the data base object.

17. A database system having a database, a memory, and a processor coupled to the memory, the database system further having a database interface system including a database interface represented via executable content stored in the memory and executed by the processor to read data from a database object stored in the database, the database interface system comprising:
means for performing an uncommitted read including an optimistic read of the database object during a transaction, wherein the optimistic read is performed without enforcing consistency requirements of data that is not required to be committed to the database;
means for executing a first consistency check of the database object to determine whether the data is consistent with the database;
means for performing a committed read including a first pessimistic read of the database object during the transaction when the first consistency check indicates the data as being inconsistent with the database, wherein the performing of the committed read includes committing the data to the database and allowing concurrent modification of the database object;
executing a second consistency check of the database object to determine whether the data is consistent with the database, in response to the first pessimistic read; and
means for performing a guaranteed read including a second pessimistic read of the database object during the transaction when the second consistency check indicates the data not being consistent with the database, wherein the performing of the guaranteed read includes committing the data to the database and disallowing concurrent modification of the database object.

18. The database system of claim 17, wherein performing the committed read that results in the data being inconsistent with the database comprises means for performing a consistency check of the data that indicates the data is inconsistent with the database.

19. The database system of claim 17, wherein performing the guaranteed read that disallows concurrent modification of the database object comprises means for exclusively locking the database object, excluding any other concurrent operation on the database object.

20. The database system of claim 17, wherein performing the guaranteed read that disallows concurrent modification of the database object comprises means for creating a shared lock on the database object, excluding any other concurrent operation from modifying, updating, deleting, or writing to the database object.

21. The database system of claim 20, wherein creating the shared lock comprises means for allowing concurrent read operations of the database object.

22. The database system of claim 17, wherein:
performing the committed read of the database object comprises means for performing a database read at an isolation level greater than an uncommitted read isolation level; and wherein
performing the guaranteed read of the database object comprises means for performing the database read at an isolation level greater than or equal to a consistent object isolation level.

23. The database system of claim 17, wherein:
performing the committed read of the database comprises means for performing the committed read of the database object responsive to performing the uncommitted read that results in the data being inconsistent with the data base object; and wherein
performing the guaranteed read of the database object comprises means for performing the guaranteed read of the database object responsive to performing the committed read that results in the data being inconsistent with the data base object.

24. A machine-readable storage medium having instructions stored thereon that, when executed by a processor, cause the processor to perform the following operations, comprising:
performing an uncommitted read including an optimistic read of the database object during a transaction, wherein the optimistic read is performed without enforcing consistency requirements of data that is not required to be committed to the database;

executing a first consistency check of the database object to determine whether the data is consistent with the database:

performing a committed read including a first pessimistic read of the database object during the transaction when the first consistency check indicates the data as being inconsistent with the database, wherein the performing of the committed read includes committing the data to the database and allowing concurrent modification of the database object; and executing a second consistency check of the database object to determine whether the data is consistent with the database, in response to the first pessimistic read; and performing a guaranteed read including a second pessimistic read of the database object during the transaction when the second consistency check indicates the data not being consistent with the database, wherein the performing of the guaranteed read includes committing the data to the database and disallowing concurrent modification of the database object.

25. The machine-readable storage medium of claim 24, wherein:

the uncommitted read that results in the data being inconsistent with the database comprises reading data that is not committed to the database when the database object is read, and is subsequently abandoned; and wherein the committed read that results in the data being inconsistent with the database comprises reading data that is committed to the database when the database object is read, and subsequently or concurrently modified.

26. The machine-readable storage medium of claim 24, wherein the uncommitted read that results in the data being inconsistent with the database comprises the database identifying the uncommitted read as one of a dirty read, a non-repeatable read, or a phantom read of the database object.

27. The machine-readable storage medium article of claim 24, wherein the uncommitted read that results in the data being inconsistent with the database comprises receiving, from the database, an error indicating the data is not consistent with the database.

28. The machine-readable storage medium of claim 24, wherein the guaranteed read that disallows concurrent modification of the database object comprises creating a shared lock on the database object, excluding any other concurrent operation from modifying, updating, deleting, or writing to the database object, and wherein creating the shared lock allows concurrent read operations of the database object.

29. The machine-readable storage medium of claim 24, wherein:

the guaranteed read of the database object comprises a repeatable read or a serialized read of the database object.

30. The machine-readable storage medium of claim 24, wherein:

the committed read of the database comprises the committed read of the database object to be performed responsive to the uncommitted read that results in the data being inconsistent with the data base object; and wherein the guaranteed read of the database object comprises the guaranteed read of the database object to be performed responsive to the committed read that results in the data being inconsistent with the data base object.

\* \* \* \* \*